(12) United States Patent
Kammann

(10) Patent No.: US 9,050,865 B2
(45) Date of Patent: Jun. 9, 2015

(54) METHOD AND APPARATUS FOR DETERMINING THE MILEAGE OF A TIRE

(75) Inventor: Stefan Kammann, Kelkheim (DE)

(73) Assignee: Continental Automotive GmbH, Hannover (DE)

( * ) Notice: Subject to any disclaimer, the term of this patent is extended or adjusted under 35 U.S.C. 154(b) by 325 days.

(21) Appl. No.: 12/986,712

(22) Filed: Jan. 7, 2011

(65) Prior Publication Data

US 2011/0166825 A1    Jul. 7, 2011

(30) Foreign Application Priority Data

Jan. 7, 2010    (DE) .................. 10 2010 004 149

(51) Int. Cl.
| | |
|---|---|
| *G01B 11/14* | (2006.01) |
| *E01C 23/00* | (2006.01) |
| *G01N 19/02* | (2006.01) |
| *B60C 23/04* | (2006.01) |
| *G01C 22/02* | (2006.01) |

(52) U.S. Cl.
CPC ............ B60C 23/0408 (2013.01); G01C 22/02 (2013.01); *B60C 2019/004* (2013.01)

(58) Field of Classification Search
CPC .............. B60C 23/061; B60C 23/0488; B60C 23/0408; B60C 2019/004; B60C 11/24; G01C 22/02; G01M 17/02
USPC ........ 702/165, 163; 340/442, 426.33; 73/146, 73/146.3, 146.5, 8
See application file for complete search history.

(56) References Cited

U.S. PATENT DOCUMENTS

| | | | | |
|---|---|---|---|---|
| 6,823,728 | B1* | 11/2004 | Barnes ........................... | 73/146 |
| 7,983,875 | B2 | 7/2011 | Duret | |
| 2002/0075144 | A1* | 6/2002 | DeZorzi ........................ | 340/442 |
| 2006/0006991 | A1* | 1/2006 | Tyndall et al. ................ | 340/442 |
| 2009/0205405 | A1* | 8/2009 | Bauchot et al. ..................... | 73/8 |
| 2010/0000310 | A1* | 1/2010 | Braghiroli ....................... | 73/146 |
| 2010/0294032 | A1* | 11/2010 | Pannek et al. .................. | 73/146 |

FOREIGN PATENT DOCUMENTS

| | | |
|---|---|---|
| CN | 101010209 A | 8/2007 |
| CN | 101013038 A | 8/2007 |
| DE | 4402136 A1 | 7/1995 |
| DE | 19522269 A1 | 1/1997 |
| DE | 102007039242 A1 | 2/2009 |
| JP | 2008007026 A | 1/2008 |

\* cited by examiner

*Primary Examiner* — Eliseo Ramos Feliciano
*Assistant Examiner* — Yoshihisa Ishizuka
(74) *Attorney, Agent, or Firm* — Laurence A. Greenberg; Werner H. Stemer; Ralph E. Locher

(57) ABSTRACT

A method and an apparatus for determining the mileage of a tire, include measuring a first current mileage over a limited period a first time, measuring a second current mileage over a limited period a second time, providing a measurement-free rest period between the first measurement and the second measurement, and estimating the mileage during the rest period on the basis of the first current mileage and/or the second current mileage. In addition, the method is repeated, with the already performed second measurement replacing the first measurement. Since a supply of power is not needed or at least can be significantly reduced during the rest period, the power requirement for mileage determination during the life of the tire can be significantly reduced, which allows simplified supply of power for mileage determination.

20 Claims, 1 Drawing Sheet

METHOD AND APPARATUS FOR DETERMINING THE MILEAGE OF A TIRE

CROSS-REFERENCE TO RELATED APPLICATION

This application claims the priority, under 35 U.S.C. §119, of German Patent Application DE 10 2010 004 149.1, filed Jan. 7, 2010; the prior application is herewith incorporated by reference in its entirety.

BACKGROUND OF THE INVENTION

Field of the Invention

The invention relates to a method and an apparatus which can be used to determine the mileage of a tire.

German Patent Application DE 105 22 269 discloses a method and an apparatus for determining the mileage of a motor vehicle tire, in which during each revolution of the motor vehicle tire a piezoelectric element produces a voltage pulse which can be used to count the precise number of wheel revolutions in a counting unit.

A drawback of such a determination of mileage is the supply of power to the components involved. The necessary power can be introduced through the use of electromagnetic coupling, which means that a correspondingly high level of complexity is required in terms of equipment and construction. Alternatively, the necessary power can be provided by a battery, which needs to be of appropriately large construction to be able to detect each individual wheel revolution throughout the life of the tire.

SUMMARY OF THE INVENTION

It is accordingly an object of the invention to provide a method and an apparatus for determining the mileage of a tire, which overcome the hereinafore-mentioned disadvantages of the heretofore-known methods and apparatuses of this general type and which allow a simplified supply of power for mileage determination.

With the foregoing and other objects in view there is provided, in accordance with the invention, a method for determining the mileage of a tire, particularly a motor vehicle tire. The method comprises measuring a first current mileage over a limited period a first time, measuring a second current mileage over a limited period a second time, providing a measurement-free rest period between the first measurement and the second measurement, estimating the mileage during the rest period based on the first current mileage and/or the second current mileage, and repeating the method with the already performed second measurement replacing the first measurement.

Due to the measurement-free rest period between two measurements, it is not necessary to provide electric power for the electrics of the mileage determination, which means that some of the electric components, particularly the measurement sensor system for measuring the current mileage, can change to a sleep mode or can even be isolated completely from a provided power source, particularly a battery, for example through the use of a switch. However, in order to determine and/or measure the duration or length of the measurement-free rest period, an electronic circuit can remain switched on. Due to the thereby reduced power requirement, the supply of power can be simplified and, in particular, a battery having much smaller dimensions can be used. Since the components for mileage determination can be disposed within the tire, in particular, the battery having significantly smaller dimensions significantly reduces imbalances acting on the tire as a result of the battery and the components connected to the battery. The method according to the invention makes use of the insight that the extremely large number of wheel revolutions during the life of a tire does not require exact determination of the actual wheel revolutions. Instead, measurements at intervals of time from one another are used to estimate the number of wheel revolutions between the two measurements. Errors arising during acceleration or deceleration can balance out one another over the entire operating period of the mileage determination, so that the replacement of continuous measurement by more random measurement at intervals of time makes a relative measurement error over an ever longer operating period ever smaller. The method can be used to measure the number of wheel revolutions in a particular interval of time, so that it is possible to determine a present load on the tire of wheel revolutions per unit time. Since the diameter of the tire is usually known and optionally it is possible to store possible abrasion over the life of the tire in the components for mileage determination, it is possible to use the tire diameter and the determined number of wheel revolutions to determine the distance already travelled with a particular tire (mileage of the tire). The respective current mileage of the tire can be ascertained by determining the wheel revolutions in a particular interval of time during the first measurement and the second measurement. On the basis of this, it is then possible to use suitable methods of estimation to estimate a current mileage (wheel revolutions per unit time) that is altered between the first measurement and the second measurement, and optionally the profile of that mileage, and to take it into account when determining the overall mileage of the tire. The respective current mileage is recurrently measured at known intervals of time which may be constant or variable, wherein a comparison of the second measurement with the first measurement involves the respective most recent measurement being regarded as the second measurement and the respective measurement for that being regarded as the first measurement. The respective old values of the first measurement can be overwritten or temporarily or permanently stored, for example in order to be better able to estimate the mileage actually travelled during the rest period on the basis of the time profile of the measured current mileages.

In accordance with another mode of the invention, preferably the estimation of the mileage during the rest period is based on a linearly interpolated profile of the mileage during the rest period, with the profile being linearly interpolated between the first current mileage and the second current mileage. If the second current mileage corresponds to the first current mileage, a substantially constant value is obtained for the mileage during the rest period. If the second current mileage is greater or lesser than the current mileage, a linear rise or fall is obtained for the mileage during the rest period (wheel revolutions per unit time). It is possible to estimate the number of wheel revolutions during the rest period on the basis of this. Laborious calculations are not required for this, which means that the power requirement for estimating the number of wheel revolutions during the rest period is correspondingly low.

In accordance with a further mode of the invention, the estimation of the mileage during the rest period is based on a constant profile for the mileage during the rest period at the level of the first current mileage or at the level of the second current mileage or on an intermediate value between the first current mileage and the second current mileage. Since the rest period is based on a constant value for the mileage (wheel revolutions per unit time), the number of wheel revolutions during the rest period can be estimated particularly quickly and easily. Normally, an error which arises when the tire accelerates will substantially be compensated for by an opposite error when the tire decelerates. In particular, the rest period is based on the arithmetic mean of the first current mileage and the second current mileage, so that more short-term statements about the mileage in a particular interval of time can also be made with sufficient accuracy.

In accordance with an added mode of the invention, with particular preference, the duration of the measurement-free rest period is varied on the basis of at least one current mileage, with the duration of the measurement-free rest period being decreased when the current mileage is increasing and the duration of the measurement-free rest period being increased when the current mileage is decreasing. If the measured current second mileage is higher than the first current mileage, an increasing current mileage is determined and the measurement-free rest period is reduced, and vice versa. This allows the number of wheel revolutions taking place during the rest period to be kept substantially constant and to be checked upon the next second measurement of the second current mileage. On the basis of this check and the ascertainment of a better estimate for the wheel revolutions which have actually taken place during the rest period, it may be possible to vary the duration of the use-free rest period again. The accuracy of the mileage determination can be kept substantially constant as a result. This allows a prescribed accuracy to be taken as a basis for minimizing the power requirement for mileage determination. With particular preference, a maximum period is prescribed for the duration of the measurement-free rest period so that, by way of example, a stationary wheel does not involve the duration of the rest period being set to infinity. If the rest period is set to infinity and/or the mileage determination is switched off completely, a starting sequence is provided, in particular, in order to restart the mileage determination. By way of example, the mileage determination for a motor vehicle tire may involve the sensor system for mileage determination being switched off completely when the motor vehicle is switched off. When the motor vehicle is started and/or when there is a change from a park mode to a drive mode, a signal can be output in order to likewise start the mileage determination.

In accordance with an additional mode of the invention, preferably the duration of the measurement-free rest period is calculated on the basis of at least one measured current mileage in such a way that a number N of wheel revolutions of $5 \leq N \leq 1000$, particularly $10 \leq N \leq 250$, preferably $15 \leq N \leq 80$ and particularly preferably $20 \leq N \leq 25$, falls into the measurement-free rest period. This envisaged number of wheel revolutions during the rest period allows the measured first current mileage and the measured second current mileage to be taken as a basis for estimating the actual number of wheel revolutions during the rest period with sufficient accuracy.

In accordance with yet another mode of the invention, preferably the first measurement during a first prescribed measurement time involves measurement of a first number of wheel revolutions for determining the first current mileage and/or the second measurement during a second prescribed measurement time involves measurement of a second number of wheel revolutions for determining the second current mileage. On the basis of the prescribed measurement times, the requisite power consumption for the measurement can actually be estimated accurately in advance, which allows particularly efficient power management. If necessary, the prescribed measurement time can be varied on the basis of at least one of the measured current mileages so as firstly to allow a prescribed measurement time which is as short as possible and secondly to be able to take account of an intended minimum number of wheel revolutions in the prescribed measurement time as far as possible. This allows sufficient accuracy to be achieved for the current mileage ascertained during the prescribed measurement time.

In accordance with yet a further mode of the invention, the first measurement during a first prescribed number of wheel revolutions involves measurement of a first measurement time for determining the first current mileage and/or the second measurement during a second prescribed number of wheel revolutions involves measurement of a second measurement time for determining the second current mileage. On the basis of the prescribed number of wheel revolutions, it is ensured that the ascertained current mileage is sufficiently accurate to estimate the mileage between the two measurements during the rest period with sufficient accuracy.

In accordance with yet an added mode of the invention, with particular preference, the mileage is supplied to a load sensor for estimating the current load on the tire, with the load sensor being connected to a pressure sensor for measuring the internal pressure of the tire. This makes it possible to determine what portion of the mileage is travelled at too high and/or too low a tire air pressure. This makes it possible to detect excessive load on the tire, which could result in early tire damage, and to initiate a warning.

With the foregoing and other objects in view there is provided, in accordance with the invention, an apparatus for determining the mileage of a tire, particularly a motor vehicle tire, in particular for carrying out the method according to the invention. The apparatus comprises a measurement sensor for performing a first measurement, over a limited period, of a first current mileage and a second measurement, over a limited period, of a second current mileage, a voltage source, particularly a battery, for operating measurement electrics for the measurement sensor, a switch for interrupting and/or connecting the voltage source for supplying power to the measurement sensor to provide a measurement-free rest period between the first measurement and the second measurement, and a computation unit connected to the measurement sensor for estimating the mileage during the rest period on a basis of at least one of the first current mileage or the second current mileage.

Since a supply of power is not required or can at least be significantly reduced during the rest period, the power consumption for mileage determination during the life of the tire can be significantly reduced. This allows simplified supply of power, particularly through the use of a battery having significantly smaller dimensions, without fundamentally impairing the measurement accuracy of the mileage determination. In particular, the apparatus may be provided on or in the tire having a mileage which is intended to be determined.

Preferably, the ascertained measurement results and the mileage reached after a particular time are transmitted wirelessly, for example by radio, to a receiver positioned outside the tire, where they are processed further. Optionally, data can be returned to the apparatus provided in the tire for the purpose of setting parameters for the apparatus. This allows the duration of the rest period or the length of the first measurement or of the second measurement to be varied, for example.

In accordance with another feature of the invention, the computation unit has connected to it a contact area pass counter for counting wheel revolutions, particularly a piezo-electric element which is connected to a counting unit, and/or a time sensor for measuring periods and/or a volatile and/or permanent memory for storing the mileage, the at least one first current mileage, the second current mileage, the number of wheel revolutions and/or periods. The piezoelectric element, which is in direct contact with the tire, in particular, can be used to produce a voltage pulse as a result of the deformation which occurs upon each revolution when the tire is rolling, and the voltage pulse is able to be used to count the wheel revolutions. The time sensor can accurately measure the measurement periods and the rest period, in particular, so that the first measurement and the second measurement can be correctly clocked and gauged. The permanent memory can be used, in particular, to safely store the mileage reached up to the present time. During operation of the mileage determination, interim results and particularly at least one first current mileage and/or the second current mileage can be buffer stored.

Other features which are considered as characteristic for the invention are set forth in the appended claims.

Although the invention is illustrated and described herein as embodied in a method and an apparatus for determining the mileage of a tire, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
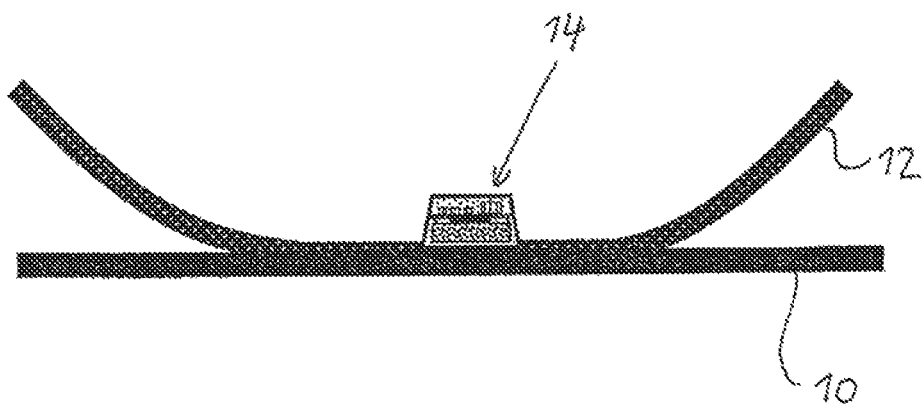
FIG. 1 is a diagrammatic, partially-sectional view of a tire with an apparatus for mileage determination.

Referring now to the figures of the drawings in detail and first, particularly, to FIG. 1 thereof, there is seen an interior of a tire 12 rolling on a road 10 and having an apparatus 14 for determining the mileage of the tire 12.

Figure 2:
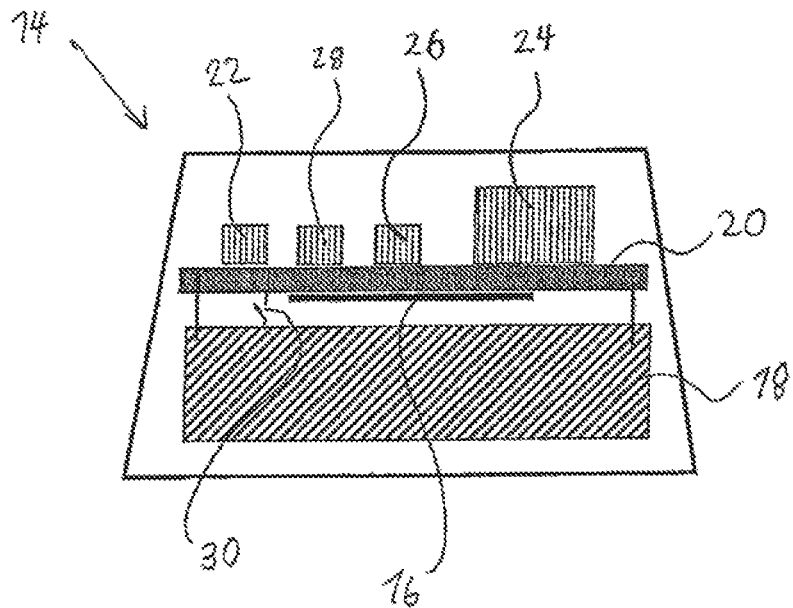
FIG. 2 is an enlarged, sectional view of the apparatus for mileage determination.

As FIG. 2 shows, the apparatus 14 has a measurement sensor 16 which is in the form of a contact area pass counter and which, by way of example, has a piezoelectric element which is deformed, and can therefore output a voltage pulse, upon each wheel revolution of the tire 12. This voltage pulse can be used to count the contact area passes of the tire 12 using a counting unit 28 and to determine the current mileage (wheel revolutions per unit of time). Since the mileage (or kilometrage) of the tire 12 is ascertained not continuously but rather randomly at multiple times which are at intervals from one another, a battery 18 of correspondingly small construction is sufficient to supply sufficient power to the apparatus 16 for the entire life of the tire 12. The measurement sensor 16 is connected to a printed circuit board 20 and, through the printed circuit board 20, is electrically connected to the counting unit 28 and to a time sensor 22 for measuring periods. The time sensor 22 can accurately measure, in particular, measurement periods, in which the measurement sensor 16 is measuring, and a rest period, in which the measurement sensor 16 is not measuring. Data from the measurement sensor 16 and data from the time sensor 22 can be stored by using a permanent and/or volatile memory 24. The memory 24 can, particularly, safely store the mileage reached up to the present time. The apparatus 14 also has a computation unit 26 for estimating the mileage during the rest period on the basis of the measurement of the current mileage and a previous current mileage. To this end, the computation unit 26 can access the data stored in the memory 24. In addition, the computation unit 26 can use the time sensor 22 to calculate when portions of the apparatus 14, particularly the measurement sensor 16 and the counting unit 28, can be switched off through the use of a switch 30 during the rest period in order to save power.

The invention claimed is:

1. A method for determining a mileage of a tire, the method comprising the following steps:
   determining a first current mileage over a first limited period of time using a measurement sensor system by one of:
   1) measuring, while the tire is rolling on the road, a first number of wheel revolutions occurring during a first prescribed measurement time; or
   2) measuring, while the tire is rolling on the road, a first time during which a first prescribed number of wheel revolutions occur;
   determining a second current mileage over a second limited period of time using the measurement sensor system by one of:
   1) measuring, while the tire is rolling on the road, a second number of wheel revolutions occurring during a second prescribed measurement time; or
   2) measuring, while the tire is rolling on the road, a second time during which a second prescribed number of wheel revolutions occur;
   providing a measurement-free rest period between the first current mileage measurement and the second current mileage measurement in which the measurement sensor system changes to a sleep mode or is isolated from a provided power source, a duration of the measurement-free rest period extending over a plurality of wheel revolutions N;
   estimating the mileage during the measurement-free rest period with a computation unit configured to estimate the mileage based on at least one of the first current mileage or the second current mileage; and
   repeating the method with the already performed second measurement replacing the first measurement.

2. The method according to claim 1, which further comprises using a profile of the mileage during the rest period, linearly interpolated between the first current mileage and the second current mileage, to estimate the mileage during the rest period in the estimating step.

3. The method according to claim 1, which further comprises using a constant profile of the mileage during the rest period at a level of the first current mileage or at a level of the second current mileage or an intermediate value between the first current mileage and the second current mileage, to estimate the mileage during the rest period in the estimating step.

4. The method according to claim 1, which further comprises varying a duration of the measurement-free rest period on a basis of at least one current mileage, decreasing the duration of the measurement-free rest period when the second current mileage is higher than the first current mileage and increasing the duration of the measurement-free rest period when the first current mileage is higher than the second current mileage.

5. The method according to claim 1, which further comprises carrying out the first measurement during a first prescribed measurement time by measurement of a first number of wheel revolutions for determining the first current mileage and/or carrying out the second measurement during a second prescribed measurement time by measurement of a second number of wheel revolutions for determining the second current mileage.

6. The method according to claim 1, which further comprises carrying out the first measurement during a first prescribed number of wheel revolutions by measurement of a first measurement time for determining the first current mileage and/or carrying out the second measurement during a second prescribed number of wheel revolutions by measurement of a second measurement time for determining the second current mileage.

7. The method according to claim 1, which further comprises measuring an internal pressure of the tire with a pressure sensor and using the measured internal pressure of the tire and the mileage for estimating a current load on the tire.

8. The method according to claim 1, wherein the tire is a motor vehicle tire.

9. The method according to claim 1, which further comprises calculating a duration of the measurement-free rest period based on at least one of the measured first current mileage or the measured second current mileage causing a number N of wheel revolutions of $5 \leq N \leq 1000$ to fall into the measurement-free rest period.

10. The method according to claim 9, wherein $10 \leq N \leq 250$.

11. The method according to claim 9, wherein $15 \leq N \leq 80$.

12. The method according to claim 9, wherein $20 \leq N \leq 25$.

13. An apparatus for determining the mileage of a tire, the apparatus comprising:
    a measurement sensor for performing a first measurement, over a first limited period of time, of a first current mileage and a second measurement, over a second limited period of time, of a second current mileage, said measurement sensor configured to obtain each of said first current mileage and said second current mileage by one of:
    1) measuring, while the tire is rolling on the road, a number of wheel revolutions occurring during a prescribed measurement time; or
    2) measuring, while the tire is rolling on the road, a time during which a prescribed number of wheel revolutions occur;
    a voltage source for operating measurement electrics for said measurement sensor;
    a switch for at least one of interrupting or connecting said voltage source for supplying power to said measurement sensor to provide a measurement-free rest period between the first measurement and the second measurement during which the measurement sensor is not measuring, a duration of said measurement-free rest period extending over a plurality of wheel revolutions N; and
    a computation unit connected to said measurement sensor for estimating the mileage during the rest period on a basis of at least one of the first current mileage or the second current mileage.

14. The apparatus according to claim 13, wherein the tire is a motor vehicle tire.

15. The apparatus according to claim 13, wherein said voltage source is a battery.

16. The apparatus according to claim 13, wherein the apparatus is configured to:
    a) measure a first current mileage over a first limited period of time;
    b) measure a second current mileage over a second limited period of time;
    c) provide a measurement-free rest period between the first current mileage measurement and the second current mileage measurement;
    d) estimate the mileage during the measurement-free rest period with a computation unit configured to estimate the mileage based on at least one of the first current mileage or the second current mileage; and
    e) after d) repeat b)-d) with the already performed second measurement replacing the first measurement.

17. The apparatus according to claim 13, which further comprises a time sensor connected to said computation unit for measuring periods.

18. The apparatus according to claim 13, which further comprises at least one of a volatile or permanent memory for storing at least one of the mileage, the first current mileage, the second current mileage, a number of wheel revolutions or periods.

19. The apparatus according to claim 13, wherein said measurement sensor is a contact area pass counter connected to said computation unit for counting wheel revolutions.

20. The apparatus according to claim 19, wherein said contact area pass counter has a piezoelectric element connected to a counting unit.

* * * * *